United States Patent [19]

Ziegenbaig et al.

[11] 4,264,332
[45] Apr. 28, 1981

[54] PROCESS FOR THE PREPARATION OF PURE ALUMINUM CHLORIDE HEXAHYDRATE

[75] Inventors: Siegfried Ziegenbaig; Wolfgang Stölzel; Gerhard Fischer, all of Freiberg, German Democratic Rep.

[73] Assignee: Veb Mansfield Kombinat Wilhelm Pieck, Lutherstadt Eisleben, German Democratic Rep.

[21] Appl. No.: 61,988

[22] Filed: Jul. 30, 1979

[30] Foreign Application Priority Data

Jul. 31, 1978 [DD] German Democratic Rep. ... 207030

[51] Int. Cl.³ .............................................. B01D 9/02
[52] U.S. Cl. ................................................ 23/305 A
[58] Field of Search ..................... 23/305 A; 423/495; 159/45, 47 R, 17 R, DIG. 8; 62/541, 542

[56] References Cited

U.S. PATENT DOCUMENTS

| | | | |
|---|---|---|---|
| 3,285,025 | 11/1966 | Shawl | 62/541 |
| 3,406,010 | 10/1968 | Holderreed et al. | 23/305 A |
| 3,446,578 | 5/1969 | Sullivan | 423/127 |

FOREIGN PATENT DOCUMENTS 1592070 9/1970 Fed. Rep. of Germany .
1592064 12/1970 Fed. Rep. of Germany .

Primary Examiner—Hiram Bernstein
Attorney, Agent, or Firm—Michael J. Striker

[57] ABSTRACT

A process for the preparation of pure aluminum chloride hexa hydrate is disclosed, in which the crystallisate mixture from the mother solution (centrifugate) and starting solution (wash solution) is treated first to the coldest of a number of crystallization steps, pumped to the hottest step by retrograde feeding, and in which only from the hottest step is a portion of the mother solution now rich in impurities removed.

3 Claims, 1 Drawing Figure

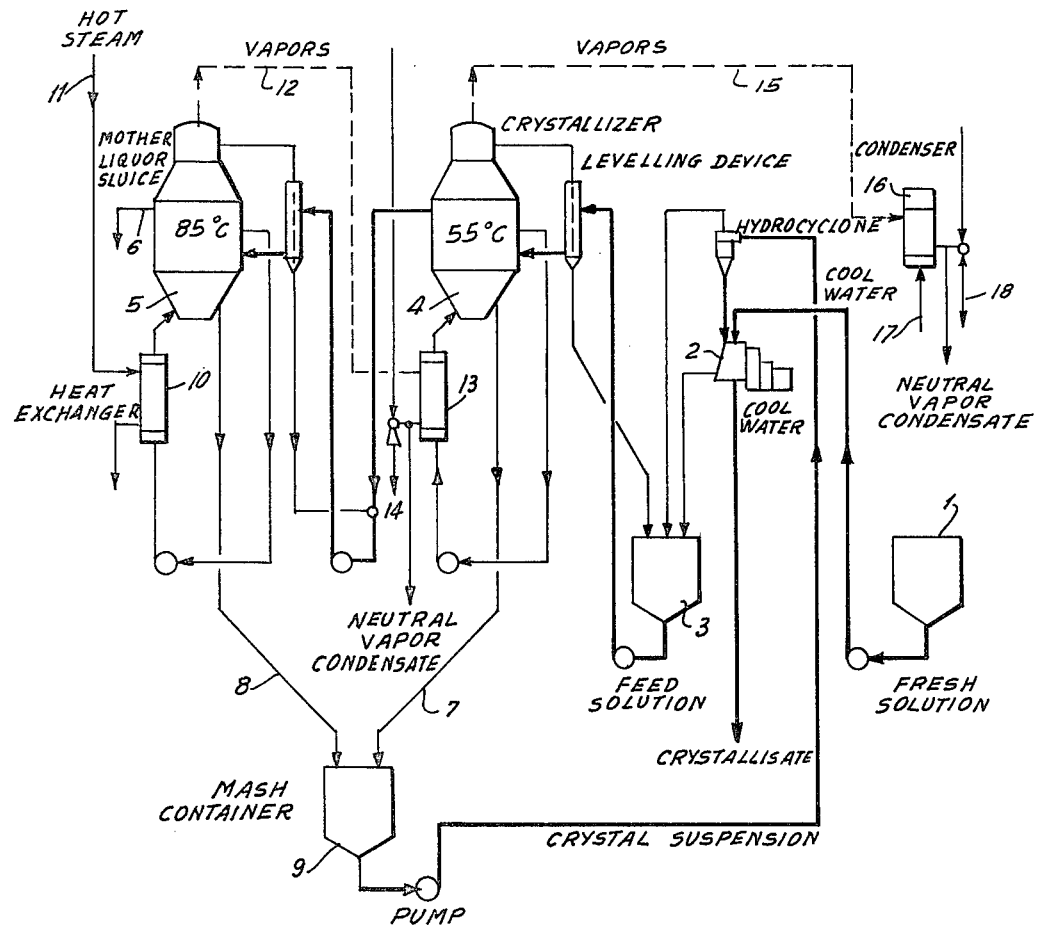

PROCESS FOR THE PREPARATION OF PURE ALUMINUM CHLORIDE HEXAHYDRATE

BACKGROUND OF THE INVENTION

The invention concerns a process for the preparation of $AlCl_3.6H_2O$ crystallisate, the thermal decomposition of which provides sufficiently pure alumina for the production of aluminum.

It is known that sufficiently pure $AlCl_3.6H_2O$ crystallisate may be prepared through multiple crystallizations (German OS No. 1592064). According to this known process, the impure crystallisate derived from the starting solution through evaporation is redissolved in water and a more purified product obtained through multiple evaporations. The redissolution of the crystallisate and the evaporation of the solvent is repeated as many times as necessary to provide a sufficiently pure crystallisate for subsequent use. This multiple recrystallization does allow for the preparation of a sufficiently pure aluminum salt; nevertheless, the evaporation of large quantities of water entails enormous energy and apparatus costs.

A further known method, in which the amounts of water to be evaporated are reduced, involves a multi-step fractional crystallization of the $AlCl_3.6H_2O$ (German OS No. 1592064, OS No. 1592070). In this known process a sufficiently pure crystallisate is prepared through an incomplete evaporation in the first step. The residual solution enriched in impurities is then passed on to the second step. The impure crystallisate prepared in this step is returned to the first stage and the residual solution further enriched in impurities is evaporated in a third step. The very impure crystallisate is returned to the second stage and the highly impure residual solution is discarded.

This known process does avoid the redissolution of the crystallisate, but requires 3 complete crystallization stages with the associated evaporators, heat exchangers and centrifuges. In addition, two heated stirring tanks are neccessary for the mashing of the crystallisates of the second and third steps. Of the three steps, only the first provides a sufficiently pure crystallisate; the other two steps are used to concentrate the circulating impurities in the minimum amount of discard solution.

A further known method involves the preparation of sufficiently pure $AlCl_3.6H_2O$ through coarse grain crystallization in a fluidized bed procedure with subsequent washing in a centrifuge with concentrated HCl. (H. O. Poppleton and D. L. Sawyer, Hydrochloric Acid Leaching of Calcined Kaolin to Produce Aluminia, TMS-paper selection, Paper No. A 77-66). This coarse grain crystallization of $AlCl_3.6H_2O$ is made difficult by the narrow metastable range and the high speed of nucleus formation. Moreover, the rate of falling out of the crystals from the solution is very low on account of the high viscosity of the solution and the minimal density difference between the crystals and the solution. In a fluidized bed process, this leads to a very low flow speed of the supersaturated solution in the fluidized bed, to low yields of crystal per $m^3$ of supersaturated solution and to low specific crystallization outputs. A further disadvantage of this process is the necessity for recovery of the concentrated hydrochloric acid from the contaminated wash solution.

Still another known process for the preparation of sufficiently pure $AlCl_3.6H_2O$ crystallisates from impure $AlCl_3$ solution involves the forced circulation of the crystal suspension through the seeding zone of the crystallizer provided with a sufficient crystal surface for reduction of supersaturation through crystal growth. In this manner is produced a fluid, coarse-grained crystallisate with a low residual moisture content, purification of which may be effected through washing with starting solution from the centrifuge which is poor in impurities. In this known process the supersaturation of the $AlCl_3$ solution through isothermal evaporation of the solvent is necessary on account of the practically temperature-independent solubility of $AlCl_3.6H_2O$. On heat technology grounds this necessitates a multistep crystallization process, in which the heating of the colder steps is principally effected using the vapors generated in the warmer steps, and hot steam is principally used for heating of the warmest steps.

DESCRIPTION OF THE INVENTION

It is therefore an object of the invention to provide a multistep method for the preparation of sufficiently pure crystallisate with a minimum energy input.

This goal is achieved according to the invention by a process in which the mixture collected from the mother solution (centrifugate) and the starting solution (wash solution), after centrifugation and washing, is fed ahead to the coldest crystallization step and through retrograde feeding is pumped to the warmest stage. Only here is the removal of discard mother solution taken, which serves as a sluice for impurities. The crystal mashes are removed from each crystallizer.

By removal of mother solution from the crystallizers, the impurity concentrations are adjusted so that no impurity-rich phases crystallize out with the $AlCl_3.6H_2O$. Of particular significance in this respect is the two salt paragenesis $AlCl_3.6H_2O/KCl$, as this first develops by customary KCl-contents of about 0.5 mass-% in the starting solution. The mother solution contains thus at 55° C. about 3.7 mass-% KCl and at 85° C. about 5.6 mass-% KCl. The higher temperature of the discard mother solution through retrograde feeding thus makes possible a higher enrichment in impurities. The amount of discard solution is thus reduced and the $AlCl_3.6H_2O$ production in the crystallisate, calculated from the $AlCl_3$-input in the starting solution, is improved.

It has also been determined that higher concentrations of $MgCl_3$ and other very soluble impurities lead to lower $AlCl_3$ concentrations in the discard solution through salting out.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The sole FIGURE is an operational flow diagram for a two-step crystallization process.

DESCRIPTION OF A PREFERRED EMBODIMENT

A hot saturated starting solution with 29 mass-% $AlCl_3$ and for example 0.2 mass-% $CaCl_2$, 0.5 mass-% KCl, 0.4 mass-% $MgCl_2$, 0.25 mass-% $CaCl_2$, 0.012 mass-% $FeCl_3$, 0.003 mass-% $SiO_2$, 0.003 mass-% $TiO_2$ and 0.004 mass-% $V_2O_5$ is introduced from tank 1 and serves to wash the crystallisate in the centrifuge 2. The mixture derived from the centrifugate and the wash solution is collected in tank 3 and is then incompletely evaporated in the cold crystallization stage 4. The residual solution from stage 4 is then pumped to the hot crystallization stage 5. At this point, an amount of mother solution is discarded as sluice for inpurities via line 6, the amount corresponding to about 8% of the starting solution volume. The therewith associated loss of $AlCl_3$ amounts to about 7% of the input in the starting situation. The crystallisate from both stages is introduced into the mash container 9 via conduits 7 and 8, and from there into the centrifuge 2. The composition after washing with starting solution includes 0.02 mass-% NaCl, 0.05 mass-% KCl, 0.05 mass-% $MgCl_2$, 0.025 mass-% $CaCl_2$, 0.0014 mass-% $FeCl_3$, 0.0003 mass-% $SiO_2$, 0.0003 mass-% $TiO_2$ and 0.004 mass-% $V_2O_5$. The heat exchanger 10 associated with the hot crystallization stage 5 is heated with low pressure steam introduced through line 11, and the heat content of the vapors generated in this stage is used for evaporation of the solvent through the use of heat exchanger 13 in the cold stage 4. The steam requirements approach 0.6 t/t crystallisate. Vapor condensate from heat exchanger 13 is discharged via conduit 14. Vapors from the cold crystallization stage 4 are introduced via conduit 15 into condenser 16; cooling water is introduced into the condenser via line 17, and neutral condensate removed through line 18.

It will be understood that each of the elements described above, or two or more together, may also find a useful application in other types of process for preparation of pure aluminum chloride hexahydrate differing from the types described above.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a process for the preparation of pure $AlCl_3.6-H_2O$ crystallisate from an impure $AlCl_3$ solution through coarse grain crystallization with forced circulation of a crystal suspension and washing with impurities-poor starting solution in a centrifuge, including at least two crystallization stages, one of which is colder relative to the other, the improvement comprising washing a crystal suspension with impurities-poor starting solution in a continuously working centrifuge, thereby separating washed crystals and centrifugate, or mother solution; introducing said mother solution into the colder crystallization stage, thereby producing a crystal mash and residual mother solution; pumping said residual mother solution through retrograde feeding to a hotter crystallization stage, thereby producing another crystal mash and residual mother solution enriched in impurities; and removing a portion of said residual mother solution enriched in impurities from said hotter crystallization stage, said portion serving as a sluice for impurities wherein the crystal mashes of all crystallization stages are removed parallel to each other and are mixed, thereby forming said crystal suspension, prior to said washing in said centrifuge.

2. A process as defined in claim 1, wherein by the high flow rate of the solution in the colder crystallization stage the impurity concentrations are maintained at a low level and, thus, crystal mash poor in impurities is obtained.

3. A process as defined in claim 1, wherein by mixing the crystal mashes of all crystallization stages, thereby forming said crystal suspension, the impurity concentrations are adjusted so that after washing in said centrifuge a product of higher purity is obtained.

* * * * *